Patented Oct. 15, 1946

2,409,519

UNITED STATES PATENT OFFICE 2,409,519

SODIUM DISPERSION

Charles Cyril Tanner, Widnes, England, assignor to Imperial Chemical Industries Limited, a corporation of Great Britain No Drawing. Application September 29, 1943, Serial No. 504,331. In Great Britain December 20, 1940

6 Claims. (Cl. 252—309)

This invention relates to improvements in chemical processes. More particularly, the invention relates to improvements in chemical processes involving the reaction of metallic sodium with organic compounds, and to improved dispersions of sodium for use therein.

A number of processes are known in which organic compounds are reacted with metallic sodium, normally in the presence of an inert liquid. A typical reaction is that known as the Fittig synthesis in which a halogenated aromatic hydrocarbon is condensed with an alkyl halide by heating with metallic sodium in the presence of anhydrous ether or of a benzene hydrocarbon. Sodium for such purposes is usually employed in the form of slices or shreds, and difficulties are frequently experienced in securing uniform and reproducible rates of reaction, partly on account of the presence of traces of oxide or other impurities on the surfaces of the metal, and of the impracticability of getting a reproducible surface-mass-ratio of the metal in successive batches. Further difficulties are frequently experienced in controlling the reaction which normally is exothermic; these difficulties can be minimized by arranging for the process to be carried out under refluxing conditions, but the refluxing temperature should be below the melting point of sodium. At temperatures above its melting point the sodium will coalesce, thus considerably reducing the area free to react with the organic constituents of the reaction mass.

According to the present invention improved dispersions of sodium in an inert liquid are obtained by dispersing molten sodium in a hot body of inert liquid having a boiling point above the melting point of sodium, cooling the dispersion to below the melting point of sodium while maintaining the sodium in the dispersed condition, and adding a second inert liquid to form with the first a mixture boiling below the melting point of the sodium. Suitably, the dispersion of the molten sodium is achieved by agitating a body of the inert liquid containing molten sodium.

According to a further feature of our invention chemical processes involving the reaction of metallic sodium with organic compounds at temperatures below the melting point of sodium are carried out by contacting such a sodium dispersion with the organic reactants at a reaction temperature not exceeding the boiling point of the mixture of inert liquids. Preferably the sodium dispersion is adjusted to boil at reaction temperature, and reaction is carried out by heating the reactants under reflux.

By the method of the present invention a high surface-mass ratio of the sodium is obtained, and the surface exposed to the reactants is formed in the reaction medium so that more uniform and reproducible conditions can be achieved; moreover, since the inert liquid mixture is adjusted to boil below the melting point of sodium it will be substantially impossible for the sodium to reach fusion temperature during the reaction if for any reason, e. g. fresh addition of reactants, sudden, temporary evolution of heat occurs. Thus the high surface-mass ratio of the sodium is maintained throughout the reaction. In the preferred form of our invention the additional advantage is secured that although there may be a slight rise in the refluxing temperature of the liquid due to solution therein of relatively non-volatile products, yet a substantially uniform reaction temperature is readily obtained without sacrificing the other advantages.

Suitable inert liquids having boiling points above the melting point of sodium which may be used include the homologues of benzene, particularly those containing two or more methyl groups as side chains, e. g. xylene and mesitylene. Excellent results have been obtained by the use of xylene. As the low boiling inert liquid benzene has been found very suitable, but we may also use aliphatic hydrocarbons such as pentane, hexane, ligroin or a petrol ether. Ethyl ether may also be used. After the reaction has been brought about these inert liquids may be distilled from the reaction liquid, separated from each other and from any unchanged reactants by fractional distillation, and used again for carrying out further similar reactions.

Suitable organic reactions in which the sodium dispersions may be employed are, for example, condensations between a halogenated aromatic hydrocarbon and an alkyl halide, or condensations between a halogenated aromatic hydrocarbon and a metal halide such as arsenic trichloride.

The manufacture of the sodium dispersion and its use in effecting chemical reactions may be illustrated with reference to the manufacture of triphenylarsine by condensing monochlorobenzene with arsenic trichloride in the presence of sodium. Suitable reaction temperatures for this reaction are of the order of 20–90° C. In carrying out the reaction according to our invention a vessel containing lumps of sodium metal in a body of a higher boiling inert liquid, e. g. xylene, is heated to a temperature between the melting point of the sodium and the boiling point of the xylene. The mass is then vigorously stirred until the molten sodium is dispersed in the xylene in the form of fine globules. The liquid is then cooled to below 97.6° C. (the melting point of sodium) so that the sodium solidifies. Suitably this is achieved by merely allowing the dispersion to stand without agitation until the temperature has fallen below 70° C., e. g. to between 60° C. and 70° C. Benzene is then added in such quantities that the xylene-benzene mixture formed has a boiling point below 97.6° C., and preferably in the range 80–90° C., at which temperature the reaction can conveniently be effected. The dispersion can then be stored until it is required for use, or it may be used immediately. To carry out the reaction the dispersion is brought to and kept at reaction temperature by heating or cooling as may be required, while gradually adding a mixture of monochlorobenzene and arsenic trichloride in the proportion of 3 mols. of the former to 1 of the latter. Heat will be evolved and the reaction liquor is kept under refluxing conditions by suitably adjusting the rate of addition of the reactants. When all the latter have been added and refluxing ceases, a further short heating may be given to complete the reaction. Benzene and xylene can then be recovered separately from each other by fractional distillation, and the triphenyl arsine recovered from the residue.

The following example illustrates but does not limit the invention, all parts being by weight.

Example

In a reaction vessel fitted with a reflux condenser, an agitator, and heating and cooling means, were placed 68 parts of sodium and 175 parts of xylene. The vessel was heated until all the sodium had melted, and the xylene was then stirred until the molten sodium was dispersed into small globules. Heating and stirring were then stopped, and after allowing the dispersion to stand until it had cooled to about 65° C. 350 parts of benzene were added, whereby a liquid was produced having a boiling point of approximately 90° C. The dispersion was then heated to refluxing temperature and a mixture of 89 parts of arsenic trichloride with 165 parts of monochlorobenzene was added gradually to give a smooth rate of reaction (as judged by the vigour of the refluxing). Reaction commenced a few minutes after the first portion of the mixture had been added and about half an hour was required to add it all. The mixture was then heated under reflux for a further 1½ to 2 hours. About 15 parts methanol were added to decompose any unreacted sodium, and then 500 parts of water to dissolve the sodium chloride produced in the reaction. The liquor was then filtered and allowed to separate into two layers and the organic layer isolated. From this layer fractions were distilled off, the first up to 100° C. and the second between 100° and 240° C., and each fraction was then redistilled to recover the benzene and the xylene for use in a subsequent batch. The undistilled portion of the organic layer was a crude product containing an amount of pure triphenylarsine corresponding to about 80% yield calculated on the monochlorobenzene employed.

I claim:
1. A process for the production of a dispersion of sodium in a mixture of inert liquids to be used in a chemical reaction which comprises dispersing, with agitation, molten sodium in an inert liquid having a boiling point above the melting point of sodium, cooling the dispersion to below the melting point of sodium while maintaining the latter in the dispersed condition and adding to said dispersion a second inert liquid having a boiling point below the melting point of sodium, said second liquid being added in sufficient amount to form with the first a mixture boiling below the melting point of the sodium.

2. A process according to claim 1, in which the dispersion of molten sodium is cooled to below 70° C.

3. A process for the production of a dispersion of sodium in a mixture of inert liquids to be used in a chemical reaction which comprises dispersing, with agitation, molten sodium in a homologue of benzene having at least two methyl groups as side chains, cooling the dispersion to below the melting point of sodium while maintaining the latter in the dispersed condition and adding to said dispersion an inert hydrocarbon having a boiling point below the melting point of sodium, said hydrocarbon being added in sufficient amount to form with the first a mixture boiling below the melting point of the sodium.

4. A process according to claim 3 in which the said hydrocarbon is benzene.

5. A process according to claim 3 in which the said hydrocarbon is selected from the group consisting of pentane, hexane, ligroin and the petrol ethers.

6. A process for the production of a dispersion of sodium in a mixture of inert liquids to be used in a chemical reaction which comprises dispersing, with agitation, molten sodium in a xylene, cooling the dispersion to below the melting point of sodium while maintaining the latter in the dispersed condition, and adding benzene to form with the xylene a mixture boiling below the melting point of the sodium.

CHARLES C. TANNER.